(12) United States Patent
Richman et al.

(10) Patent No.: US 7,543,676 B2
(45) Date of Patent: Jun. 9, 2009

(54) ENHANCED OPERATOR PRESENCE SYSTEM FOR A COTTON HARVESTER WITH AN ON-BOARD MODULE BUILDING CAPABILITY

(75) Inventors: Kevin S. Richman, Lititz, PA (US); Michael J. Covington, Bettendorf, IA (US); F. Randall Hugh, Geneseo, IL (US)

(73) Assignee: CNH America LLC, New Holland, PA (US)

( * ) Notice: Subject to any disclaimer, the term of this patent is extended or adjusted under 35 U.S.C. 154(b) by 709 days.

(21) Appl. No.: 11/093,770

(22) Filed: Mar. 30, 2005

(65) Prior Publication Data
US 2005/0217229 A1    Oct. 6, 2005

Related U.S. Application Data

(60) Provisional application No. 60/557,849, filed on Mar. 30, 2004.

(51) Int. Cl.
*B60K 28/00* (2006.01)
(52) U.S. Cl. .................. 180/271; 180/289; 100/100
(58) Field of Classification Search ......... 180/271–289; 182/271, 127; 56/10.2 R, 28, 341; 100/100
See application file for complete search history.

(56) References Cited

U.S. PATENT DOCUMENTS

| | | | |
|---|---|---|---|
| 1,899,742 A * | 2/1933 | Bay | 182/18 |
| 2,166,060 A * | 7/1939 | Kirk | 70/170 |
| 3,012,633 A * | 12/1961 | Magee | 187/279 |
| 3,646,883 A | 3/1972 | Provi | 100/53 |
| 4,162,714 A | 7/1979 | Correll | 180/53 R |
| 4,339,223 A * | 7/1982 | Golze | 414/462 |
| 4,429,761 A | 2/1984 | Haddock, Jr. et al. | 180/271 |
| 4,759,185 A | 7/1988 | McConnell | 60/444 |
| 4,936,407 A | 6/1990 | Brock et al. | 180/271 |
| 5,064,022 A * | 11/1991 | Graham | 182/85 |
| 5,065,569 A * | 11/1991 | Schlueter | 56/16.6 |
| 5,813,494 A * | 9/1998 | Ulschmid et al. | 182/97 |
| 6,189,644 B1 | 2/2001 | Taylor | 180/271 |
| 6,276,974 B1 * | 8/2001 | Bouge et al. | 440/1 |
| 6,349,786 B1 | 2/2002 | Gift | 180/271 |

FOREIGN PATENT DOCUMENTS

FR    2542265 A  *  9/1984

* cited by examiner

*Primary Examiner*—Alicia M Torres
(74) *Attorney, Agent, or Firm*—Michael G. Harms; John William Stader; Patrick M. Sheldrake

(57) ABSTRACT

An operator presence system for a cotton harvester including an on-board cotton module builder, the system including a mount for installing a ground access ladder at a first position for providing access to a service platform for routine service and maintenance, and a second mount at a second location for installing the ground access ladder adjacent to a ladder segment extending to an upper region of the machine, the mount at the second location including a switch or other device for disabling or locking out at least a hydraulic system of the module builder when the ladder is mounted to the second mount, and which re-enables operation when the ladder is removed therefrom.

5 Claims, 4 Drawing Sheets

US 7,543,676 B2

ENHANCED OPERATOR PRESENCE SYSTEM FOR A COTTON HARVESTER WITH AN ON-BOARD MODULE BUILDING CAPABILITY

This application claims the benefit of U.S. Provisional Application No. 60/557,849, filed Mar. 30, 2004.

TECHNICAL FIELD

This invention relates generally to an improvement to an operator presence system for a cotton harvester with an on-board cotton module builder or packager, and more particularly, to an operator presence system capable of disabling or locking out hydraulic and other systems of the cotton module builder when access to the upper regions of the module builder is enabled, and which re-enables operation of the module builder systems when access to the upper regions is disabled.

BACKGROUND ART

Cotton module builders and packagers include structures, mechanisms and systems including areas and components that require maintenance, inspection and/or service at scheduled intervals and other times. Access to the upper regions of the module builder, including the top surface or lid, is required at times to remove excess cotton and debris. This can be required as often as several times a day.

Currently, the operator presence system on a cotton harvester typically includes a seat switch which disables picker drum functions when the transmission of the harvester is in neutral and the operator leaves the seat for any reason. The operator can activate a switch in the console of the operator cab that enables a momentary switch on the picker units to be operated for servicing and inspecting harvesting unit components. Inspection, maintenance and service of components and structure of the upper regions of the basket assembly typically requires the operator to climb up several platforms and/or steps beside and generally behind the cab. Such basket assemblies typically include an unloading door on one side which is openable for entry into the basket interior. Some of such basket assemblies can be raised to an unloading position, so as to be located at an elevation above a basket or boll buggy into which cotton from the basket assembly is to be unloaded. Some known basket assemblies and newer module builders and packagers are tiltable for unloading a compacted body or module of cotton onto the ground or another surface. Additionally, contemplated compactor apparatus for module builders and packagers includes external apparatus which moves during the compaction and cotton distributing operation. For inspection, service and maintenance of structure and component on the upper regions of a cotton module builder, it would be desirable to disable operation of the compactor apparatus, particularly to prevent movement of external elements thereof. Cotton harvesters typically include a water tank and hydraulic fluid reservoir which are typically filled and inspected daily. Such reservoirs are typically mounted separately from the cotton module builder, and thus are not tilted when the module builder is unloaded. A service platform, such as behind the cab, can be provided for accessing the reservoirs. It would be desirable to have the ability to access the reservoirs and also the upper regions of the cotton module builder from the ground. However, due to the location of the reservoirs, disabling the hydraulics and other systems of the cotton module builder is not required.

Thus, what is sought is an operator presence system for a cotton harvester with an on-board module building capability which provides at least one of the capabilities set forth above.

SUMMARY OF THE INVENTION

What is disclosed is an improved operator presence system for a cotton harvester with an on-board cotton module capability.

The system according to the present invention includes a mount for a ground access ladder at a first position for providing access to components including the service platform for filling and inspecting the water and hydraulic fluid reservoirs. Another mount is provided for installing the ground access ladder adjacent to a ladder segment on the cotton module builder which extends to an upper region thereof, to provide access for removing excess cotton and debris, and structure and components of the upper region of the cotton module builder for inspection, service and maintenance. The mount at the second location includes a switch or other device for disabling or locking out at least the hydraulic systems of the cotton module builder when the ladder is mounted, and which re-enables operation when the ladder is removed.

As a result, when an operator is to access the water tank and hydraulic fluid reservoir, the ground access ladder will be placed at this location, and when access to the upper region of the module builder is required, the ladder will be moved to that location.

DETAILED DESCRIPTION OF THE INVENTION

Figure 1:
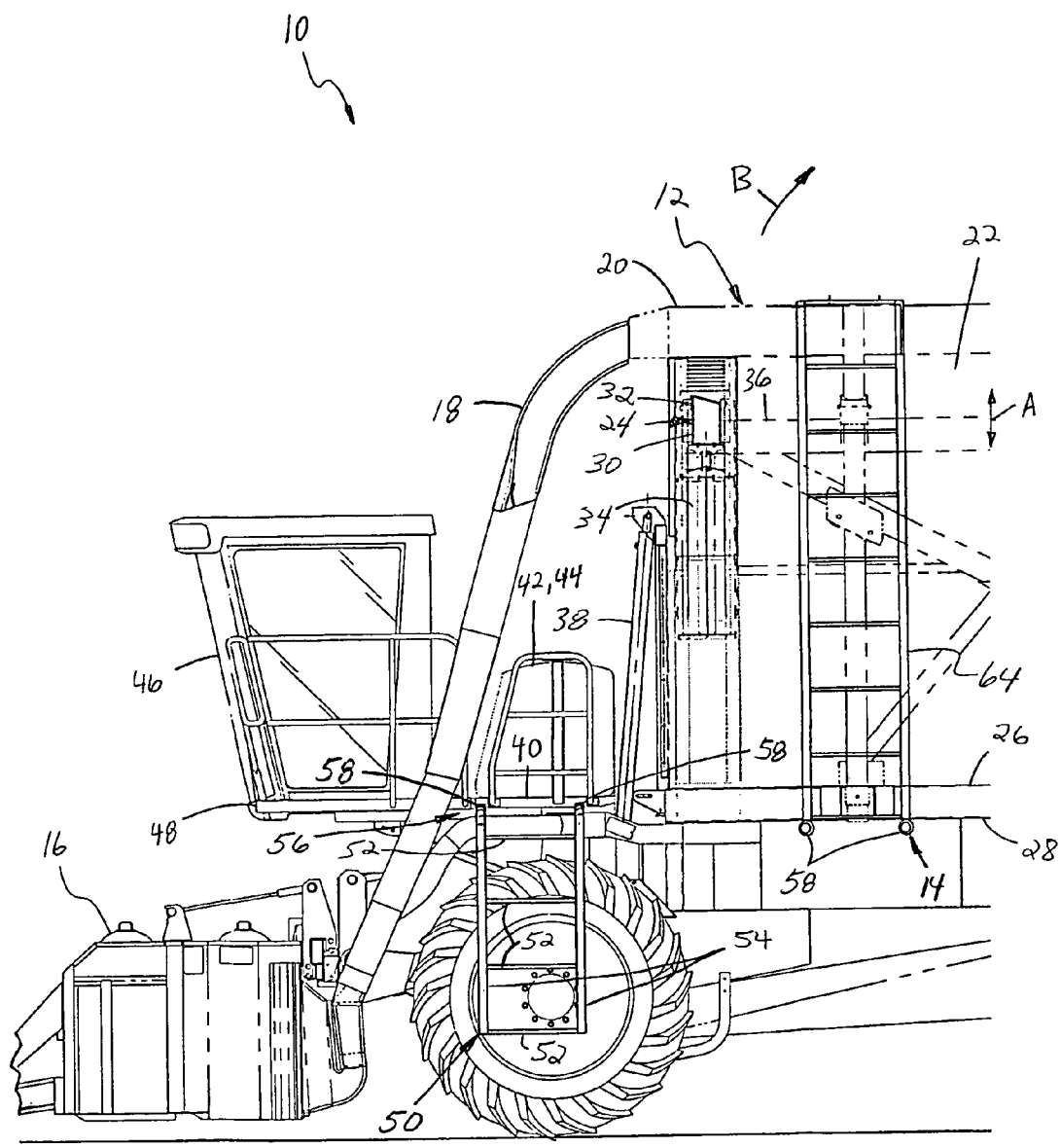
FIG. 1 is a fragmentary side view of the front end of a cotton harvester with an on-board cotton module builder, showing a ground access ladder of an operator presence system of the invention mounted in a first position for providing access to a service platform of the harvester.

Referring now to the drawings, FIG. 1 shows a cotton harvester 10 including a cotton module builder 12 including an operator presence system 14, constructed and operable according to the teachings of the present invention. Cotton harvester 10 generally includes a plurality of cotton harvesting units 16 extending across the front end thereof operable for harvesting cotton from cotton plants in the well known manner. The harvested cotton is conveyed by air flows through a plurality of ducts 18 into an upper region 20 of module builder 12. Module builder 12 generally includes a cotton compacting chamber 22 in which the cotton is collected and compacted by downward movement of compactor apparatus 24. Compactor apparatus 24 is actuated at times during the cotton harvesting operation to distribute the cotton within chamber 22 and compact it against a floor 26 of module builder 12. Floor 26 is supported by a horizontal frame 28 of module builder 12. Compactor apparatus 24 includes a compactor frame 30 including front and rear cross members, represented by a front cross member 32 which includes opposite end portions which protrude outwardly from chamber 22 through vertical slots 34 through the sides of module builder 12 adjacent the front and rear ends thereof. The cross members as represented by cross member 32 are connected to and supported by an exterior side structure 36 which is movable upwardly and downwardly relative to the exterior of cotton module builder 12, as denoted by arrow A, for moving compactor apparatus 24 upwardly and downwardly within compacting chamber 22 for performing the distributing and compacting operation. When a compacted body or module of cotton within chamber 22 is complete, and at other times, as desired or required, a ramp on a rear end of module builder 12 can be deployed (not shown) and module builder 12 tilted, as denoted by arrow B, to orient the entire module builder 12 in a rearward and downward extending orientation (also not shown) to allow unloading the module down the ramp onto the ground or another surface.

Harvester 10 includes a service platform 40 located just forwardly of frame 28 of module builder 12 which remains stationary when module builder 12 is tilted as denoted by arrow B. Service platform 40 provides access to various components, including a water tank 42 and a hydraulic fluid reservoir 44, which require inspection and refilling one or more times daily when harvesting. Platform 40, tank 42 and hydraulic fluid reservoir 44 are separated from an operator cab 46 and access platform 48, by ducts 18. To provide access to service platform 40 from the ground, the invention includes a removable ground access ladder 50 which is mountable to service platform 40 or adjacent structure, so as to extend downwardly therefrom to a location just above the ground such that an operator can climb on ladder 50 to and from service platform 40.

Ladder 50 includes a plurality of spaced horizontal rungs 52 supported by a pair of spaced apart L-shape supports 54. Ladder 50 is preferably removably mountable to platform 48 by mounting structure 56 which includes a pair of spaced tubular supports 58 welded or otherwise suitably connected to or formed on access platform 48 or adjacent structure, having interior receptacles 60 adapted for cooperatively receiving and holding end portions 62 of L-shape supports 54 of ladder 50 sufficiently securely for use by an operator for climbing.

Figure 2:
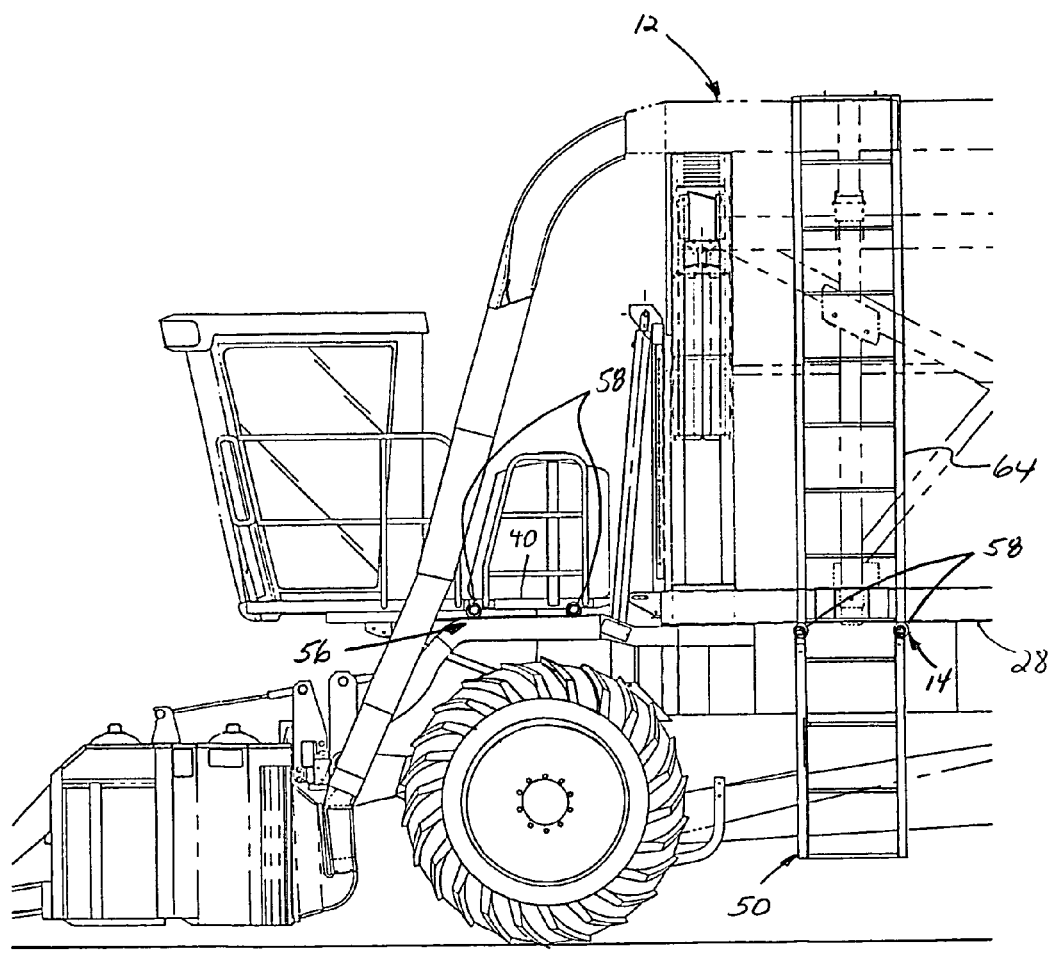
FIG. 2 is another fragmentary side view of the harvester, showing the ground access ladder of the invention mounted in a second position for allowing access to a ladder segment extending to an upper region of the module builder according to the invention.
Figure 3:
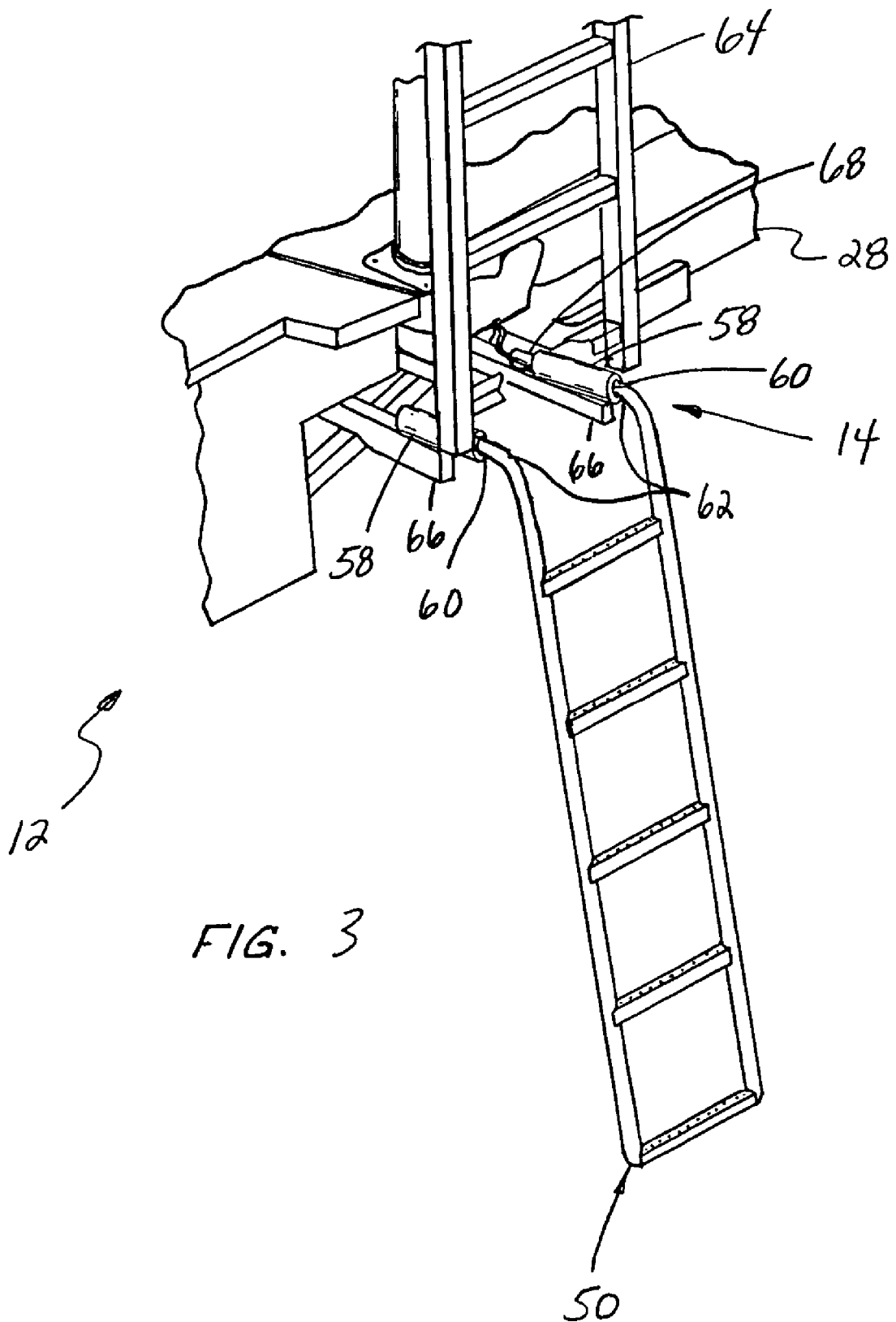
FIG. 3 is an enlarged fragmentary perspective view of the ground access ladder of the invention mounted on apparatus of the invention in the second position for providing access to the ladder segment, and a lockout switch for locking out or disabling operation of a hydraulic system of the module builder.
Figure 4:
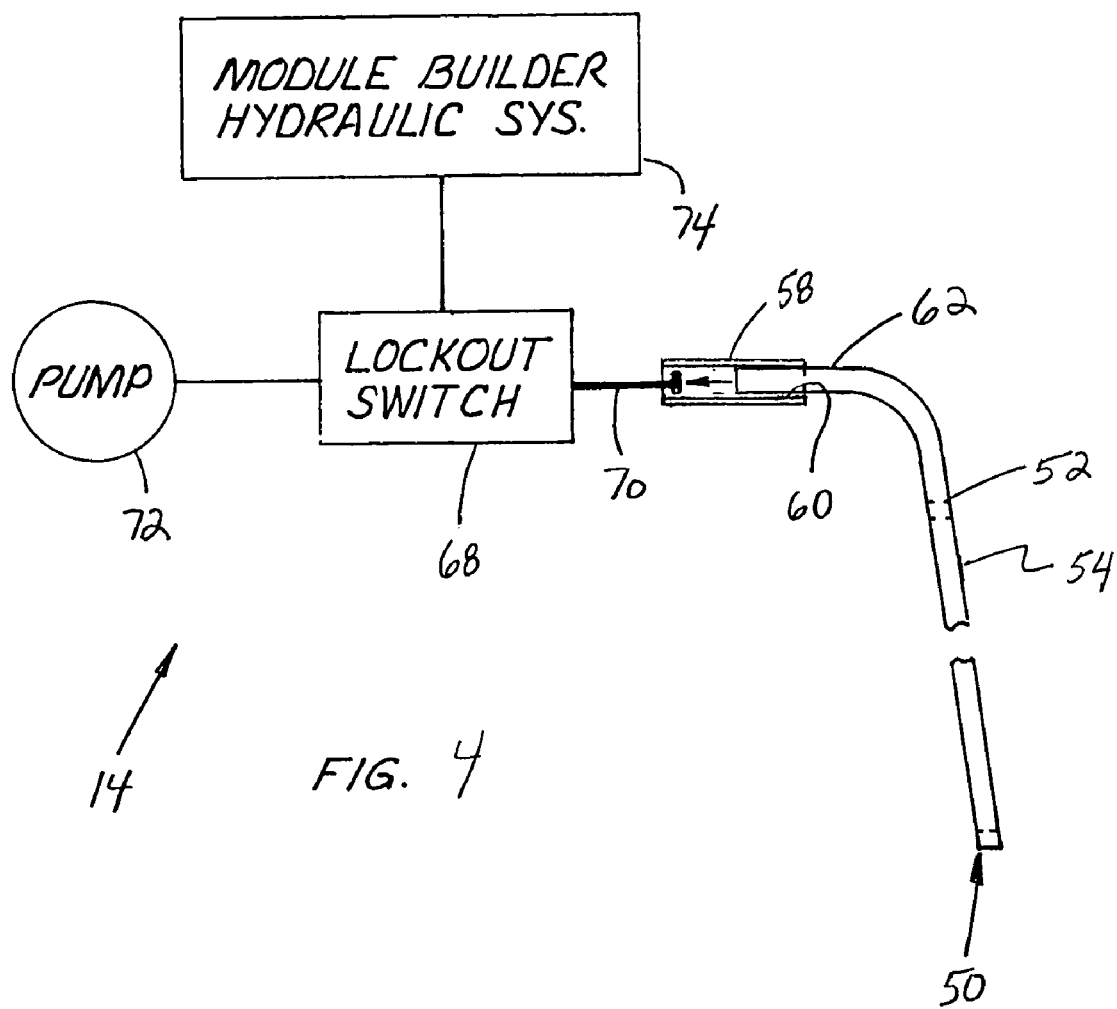
FIG. 4 is a simplified schematic representation of apparatus of the system of the invention.

Operator presence system 14 includes a second pair of tubular supports 58 mounted in proximity to a lower end of a ladder segment 64 mounted to a side of module builder 12. Ladder segment 64 extends to upper region 20 of module builder 12 to allow access to the side and upper region of the module builder for inspection, service and maintenance purposes. For instance, for removing collected cotton and debris therefrom. Referring also to FIGS. 2, 3 and 4, tubular supports 58 adjacent ladder 64 of module builder 12 include receptacles 60 adapted for cooperatively receiving end portions 62 of ground access ladder 50 to enable an operator to climb between ladder 64 and the ground or another surface on which harvester 10 is located. In the absence of the presence of ladder 50, it would be difficult for an operator to climb onto ladder segment 64. Tubular supports 58 can be mounted on a suitable member of module builder 12, such as frame 28, or to other structure adjacent to ladder 64, using any suitable elements, such as brackets 66 shown in FIG. 3, using suitable fasteners, such as bolts or the like, welding or another manner of attachment.

Operator presence system 14 includes an element located in cooperation with one or both of tubular supports 58 for disabling or locking out the hydraulic system or systems of module builder 12, which can include systems for moving compactor frame and exterior side structure 36 of compactor apparatus 24 (FIG. 1) upwardly and downwardly in the above-described manner. Operation of cylinder 38 can also be disabled or locked out. Additionally, drivers or a control system for operating the unloading ramp (not shown) on the rear of module builder 12 can be disabled. Such element preferably includes a lockout switch 68 which can be push button or other type switch including an actuator 70, which can also be a push button device, positioned to be displaced or moved from the position shown, such as toward switch 68, by the insertion of an end portion 62 of ladder 50 into a tubular support 58, so as to change the state of lockout switch 68. Lockout switch 68 is preferably disposed in the fluid circuitry between a source of pressurized fluid, such as a pump 72 and a hydraulic system 74 of the module builder, for disabling, locking out, or preventing flow of the pressurized fluid from pump 72 to system 74. As a result, with ladder 50 mounted in the position shown in FIGS. 2 and 3, the hydraulic systems will not be capable of actuating. Then, when ladder 50 is removed, actuator 70 will be returned to the position shown in FIG. 4 such that lockout switch 68 is no longer actuated, and flow of pressurized fluid from pump 72 to system 74 can resume, as can operation of the various elements of the hydraulic system.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. An operator presence system for a cotton harvester including an on-board cotton module builder, comprising:
   a mount for a removably mounting ground access ladder at a position on the harvester for providing access to a ladder on the cotton module builder, wherein the mount includes a pair of spaced apart tubular members each having receptacles for cooperatively receiving spaced apart end portions of the ground access ladder;
   a hydraulic system for controlling the cotton module builder and a pump for providing pressurized fluid to the hydraulic system;
   a lockout switch disposed in connection with fluid circuitry between the pump and the hydraulic system, the lockout switch having at least one actuator disposed in at least one of the receptacles, wherein the actuator is movable by the insertion of the end portions of the ladder into the receptacles, whereby the lockout switch disables the hydraulic system, further wherein the actuator is movable by the extraction of the end portions of the ladder out of the receptacles, whereby the lockout switch enables the hydraulic system.

2. The operator presence system of claim 1, further comprising another mount for removably mounting the ground access ladder at another position on the harvester for providing access to an upper region thereof spaced from the ladder on the cotton module builder.

3. The operator presence system of claim 1, wherein the actuator is movable within the receptacles in a substantially horizontal direction.

4. The operator presence system of claim 1, wherein the actuator is moved in a direction toward the lockout switch with the insertion of the end portions of the ladder, thereby activating the lockout switch, further wherein the actuator is moved in a direction away from the lockout switch with the extraction of the end portions of the ladder, thereby de-activating the lockout switch.

5. The operator presence system of claim 1, wherein the actuator is a push button device.

* * * * *